United States Patent [19]

Coffey et al.

[11] Patent Number: 5,552,950

[45] Date of Patent: Sep. 3, 1996

[54] DIRECT ACCESS STORAGE DEVICE WITH MAGNETO-RESISTIVE TRANSDUCING HEAD APPARATUS AND A COMMON READ RETURN SIGNAL LINE

[75] Inventors: Jerome T. Coffey, Rochester; Dale E. Goodman, Oronoco; Joe M. Poss, Rochester, all of Minn.

[73] Assignee: International Business Machines Corporation, Armonk, N.Y.

[21] Appl. No.: 347,536

[22] Filed: Nov. 30, 1994

[51] Int. Cl.⁶ .................................................. G11B 5/12
[52] U.S. Cl. ............................................ 360/128; 360/113
[58] Field of Search ........................... 360/97.01, 128, 360/113, 61, 62, 63, 64, 104, 67, 108

[56] References Cited

U.S. PATENT DOCUMENTS

| | | | |
|---|---|---|---|
| 3,641,524 | 2/1972 | Norris | 360/40 |
| 3,665,429 | 5/1972 | Thornley | 360/55 |
| 3,707,707 | 12/1972 | Spencer et al. | 360/53 |
| 3,824,623 | 7/1974 | Gucker | 360/124 |
| 4,691,259 | 9/1987 | Imakoshi et al. | 360/113 |
| 4,853,633 | 8/1989 | Matsumoto | 324/210 |
| 5,327,303 | 7/1994 | Smith | 360/67 |
| 5,412,518 | 5/1995 | Christner et al. | 360/66 |
| 5,420,734 | 5/1995 | Colineau et al. | 360/113 |
| 5,430,584 | 7/1995 | Peterson | 360/78.04 |

Primary Examiner—Robert S. Tupper
Assistant Examiner—Paul J. Ditmyer
Attorney, Agent, or Firm—Joan Pennington; Karuna Ojanen; Matthew J. Bussan

[57] ABSTRACT

A direct access storage device includes at least one disk mounted for rotation about an axis and having opposed disk surfaces for storing data. A magneto-resistive (MR) transducer head is mounted for movement across each respective disk surface for writing to and for reading data signals from the disk surface. Each MR transducer head includes a write element and a read element. A preamplifier, associated with the MR transducer head, amplifies read and write signals of the read element and the write element. A flex cable couples the read and write signals between the preamplifier and the MR transducer heads. The flex cable includes a common read return signal line for each sequential pair of the MR transducer heads.

4 Claims, 2 Drawing Sheets

DIRECT ACCESS STORAGE DEVICE WITH MAGNETO-RESISTIVE TRANSDUCING HEAD APPARATUS AND A COMMON READ RETURN SIGNAL LINE

BACKGROUND OF THE INVENTION

1. Field of the Invention

The present invention relates generally to a direct access storage device (DASD) and more particularly to a magneto-resistive transducing head signal apparatus used in a DASD.

2. Description of the Prior Art

Various types of storage units, such as direct access storage devices (DASDs) are used to store data for known data processing systems. One often used type of DASD is a magnetic disk unit including a number of disks having surfaces with magnetic active material onto which data is written and from which data is read by magnetic read/write heads. In other types of DASDs, optical or other data storage media may be employed.

In a magnetic disk unit, the disks are formatted to define sectors and tracks upon the disk surfaces. Tracks are usually circular regions coaxial with the disk axis where data may be written, and sectors are parts of the tracks capable of storing a predetermined quantity of data written to the disk. Axially aligned tracks on the disks of a DASD are referred to as cylinders. The sectors of a DASD where blocks of data are stored have unique physical data block addresses (DBA). The disks of the DASD spin in unison around a common axis, and the transducer heads, usually one for each surface, are moved radially in unison across the disk surfaces. When data is read from or written to a physical DBA, the heads are moved into alignment with the cylinder containing the track in which the DBA is found, and the data transfer takes place as the sector or sectors of the DBA spin under the head.

Magneto-resistive (MR) transducer heads provide a significant advancement in read/write technology for DASDs. The magneto-resistive effect is a physical effect observed in certain materials, whereby electrical resistance of the material changes as it moves through a magnetic field. This effect can be used to read data recorded on the surface of a magnetic disk. The recorded data bits are in effect tiny magnets which create small magnetic fields near the disk surface. A read element comprising a magneto-resistive material flies in close proximity to the disk surface, varying the resistance of the element. Since a variable resistance can be detected with some electrical current flowing through the resistive element, the selected MR read element has a bias current flowing through the element as the head flies over disk surface. A preamplifier amplifies a change in voltage related to the change in resistance of the read element, and this is ultimately translated to data.

The chief advantage of the MR transducer head over conventional inductive head technology is that the MR read element is considerably more sensitive to small magnetic fields than an inductive element, enabling higher data recording densities. The MR transducer head includes separate read and write elements because the magneto-resistive effect cannot be used to write data on the disk surface. The write element, which is a conventional inductive element, is used for writing data.

FIG. 4 illustrates a conventional arrangement for connection of two MR transducer heads in a DASD. Each MR transducer head requires four signal wires. Two signal wires are used to carry write current to the write element and two signal wires are used to carry read current from the MR read element.

MR heads provide a very low amplitude signal. Picking up unwanted noise in the electrical signal path can cause signal degradation. A preamplifier is used early in the electrical signal path to amplify the read current and the write current. In some known DASDs, the preamplifier advantageously is positioned off the actuator at a stationary location. Keeping the preamplifier off the actuator minimizes actuator mass to speed up access time. As shown in the prior art arrangement of FIG. 4, providing a stationary preamplifier requires the flex cable to carry the MR signal lines.

Disk drive dimensions are normally limited by a form factor, an industry standard of length, width and height dimensions. As disk drive device form factors become increasingly smaller, electrical connections to the using system can utilize an increasingly greater portion of the device form factor. With some form factors, the number of signal lines required for use with MR transducer heads would exceed the allowable space for the flex cable.

A need exists to provide an improved arrangement in a DASD for providing signal connections with MR transducer heads that maintains adequate noise rejection for the read signal.

SUMMARY OF THE INVENTION

It is a principal object of the present invention to provide an apparatus for providing signal connections with MR transducer heads in a direct access storage device that overcomes many of the disadvantages of prior art arrangements.

In brief, the objects and advantages of the present invention are achieved by a direct access storage device including at least one disk mounted for rotation about an axis and having opposed disk surfaces for storing data. A magneto-resistive (MR) transducer head is mounted for movement across each respective disk surface for writing to and for reading data signals from the disk surface. Each MR transducer head includes a write element and a read element. A preamplifier, associated with the MR transducer heads, amplifies read and write signals of the read element and the write element. A flex cable couples the read and write signals between the preamplifier and the MR transducer heads. The flex cable includes a common read return signal line for each sequential pair of the MR transducer heads.

BRIEF DESCRIPTION OF THE DRAWINGS

The present invention together with the above and other objects and advantages may best be understood from the following detailed description of the preferred embodiment of the invention illustrated in the drawings, wherein.

DETAILED DESCRIPTION OF THE PREFERRED EMBODIMENTS

Figure 1:
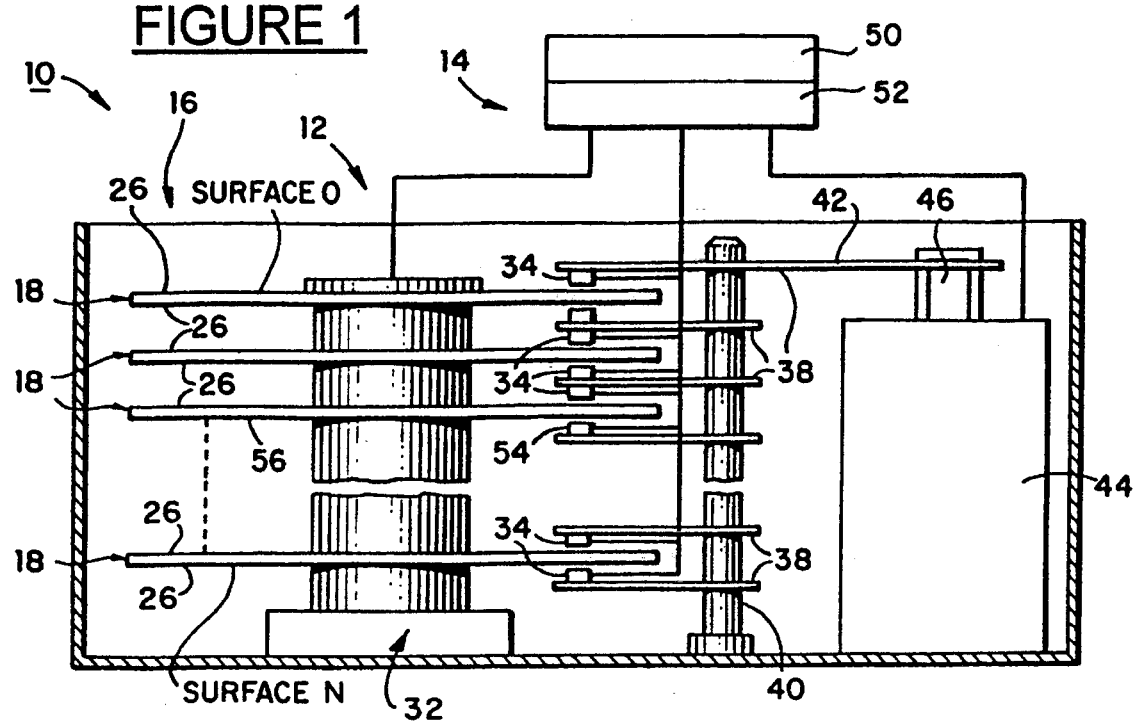
FIG. 1 is a schematic and block diagram of a data storage disk file embodying the present invention.

In FIG. 1 there is shown a partly schematic block diagram of parts of a data storage disk file 10 including a data storage medium generally designated as 12 and a control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Figure 2:
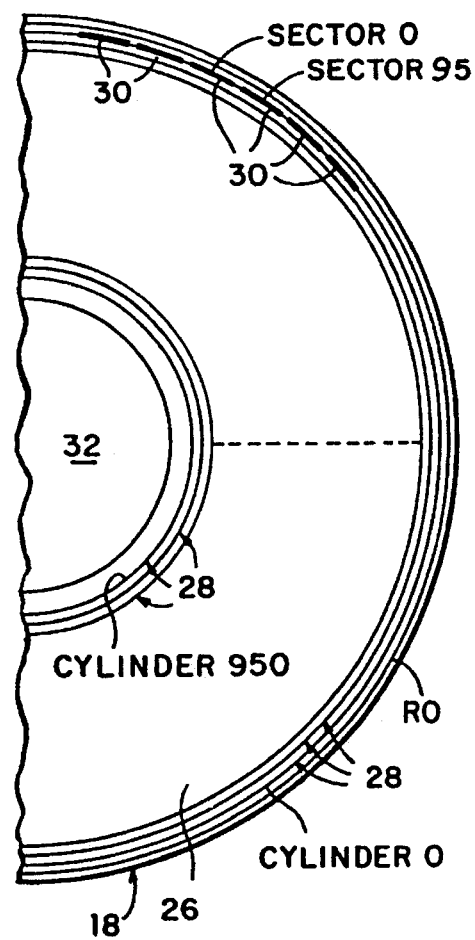
FIG. 2 is a diagram showing tracks and sectors of a data disk surface of the data storage disk file of FIG. 1.

Referring now to FIGS. 1 and 2, disk drive unit 12 includes a stack 16 of disks 18 having magnetic surfaces. Data disks 18 include a layer of magnetic material on opposed disk surfaces 26. Unit 12 includes a selected number of the double-sided data disks 18 to provide a selected storage capacity as indicated in FIG. 1 numbered from SURFACE 0 through SURFACE N. Numerous data information tracks or cylinders 28 are arrayed in a concentric pattern in the magnetic medium of each disk surface 26 of data disks 18. The data information tracks 28 are disposed at predetermined positions relative to servo reference tracks, such as R0 illustrated in FIG. 2. A data cylinder includes a set of corresponding data information tracks 28 for the data SURFACES 0–N. For example, 951 data cylinders can be included in the disk surfaces 26 numbered from 0–950 as indicated in FIG. 2. Each data information track 28 includes multiple data sectors 30 equally spaced around the cylinder; for example, 96 data sectors numbered 0–95.

The disks 18 are mounted in parallel for simultaneous rotation on and by an integrated spindle and motor assembly 32. The data information tracks 28 on each disk 18 are read and/or written to by a corresponding data transducer head 34 movable across the disk surface. Transducer heads 34 are carried by arms 38 ganged together on an actuator 40 for simultaneous pivotal movement about an axis. Actuator 40 includes an extension 42 driven in a pivotal motion by a head drive motor, which is represented in block form as feature 44. Although several drive arrangements are possible, motor 44 typically includes a coil 46 cooperating with a magnet and core assembly (not seen) operatively controlled for moving the transducer heads 34 in synchronism in a radial direction in order to position the heads in registration with the cylinders 28 to be followed.

Data utilization device 14 typically includes an interface or file processor 50 that controls transfer of data to be stored in the data sectors 30 of disks 18 for subsequent access and use. A servo processor 52 is coupled between the interface processor 50, the motors 32 and 44 and the data transducer heads 34. The servo processor 52 controls the operations of moving the heads 34 into registration with a target or selected data LBA and of transferring data under the control of the interface processor 50.

Disk access is operatively controlled by the servo processor 52. Motor 32 is operated to rotate the disk stack 16. The servo processor 52 employs servo control operations to move the data heads 34 radially with respect to the rotating disks 18 by the head drive motor 44 to selectively align each of the data transducer heads with a specific radial position of the cylinder 28 where data is to be read or written.

Figure 3:
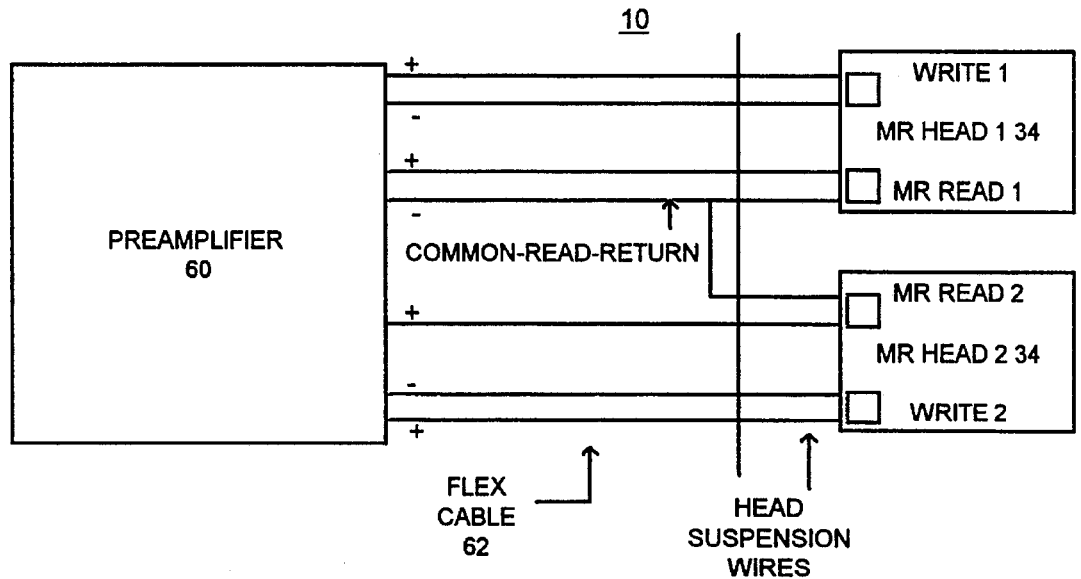
FIG. 3 is a block diagram representation illustrating magneto-resistive transducer head signal apparatus according to the present invention in the data storage disk file of FIG. 1.

Referring now to FIG. 3, there is shown a pair of sequential transducer heads 34 of the disk file 10 together with signal apparatus arranged in accordance with the invention. Transducer heads 34 are magneto-resistive (MR) heads labeled MR HEAD 1 and MR HEAD 2. Each MR head 34 includes a MR read element and a write element. Signal connections from a preamplifier 60 are provided by a flex cable 62 via a respective twisted pair of head suspension wires to each MR read element and write element. A pair of write signal lines in the flex cable 62 are required for each write element of MR heads 34. In accordance with the invention, flex cable 62 includes a single read return signal conductor or line labeled COMMON-READ-RETURN utilized for each sequential pair of MR heads 34 in the disk file 10. The COMMON-READ-RETURN extends from a point where the read head suspension wires attach to the flex cable 62.

A single ended preamplifier can be used for the preamplifier 60 which allows the read return signal line from the MR read element to be at a reference potential, typically ground potential. Reference potential for the COMMON-READ-RETURN signal line connection to the preamplifier 60 is illustrated at an I/O input by a negative (−) label. The read signal line connection to the preamplifier 60 is illustrated at an I/O input by a positive (+) label. In the disk file 10, the COMMON-READ-RETURN signal line is required to maintain adequate noise rejection for the read signal. Keeping the MR read signal line and MR COMMON-READ-RETURN signal line close together in the flex cable 62 increases the mutual inductance. As illustrated, the COMMON-READ-RETURN signal line is disposed between the respective read signal lines for MR heads 1 and 2 to maintain adequate mutual inductance for common mode noise rejection.

As shown in FIG. 3, the number of input/output (I/O) connections of the flex cable 62 is reduced by one for a disk file including two MR heads 34 and preamplifier 60. Reducing the number of signal lines on flex cable 62 provides a number of advantages including but not limited to, a reduction of the flex cable width and/or a reduction of preamplifier I/O or allowing a wider line width on the flex cable 62. In the preferred embodiment, the preamplifier 60 exists as a single integrated circuit chip. However, the read and write circuits are generally separate; it should be understood that the read and write preamplifiers can be provided on separate integrated circuit chips.

Figure 4:
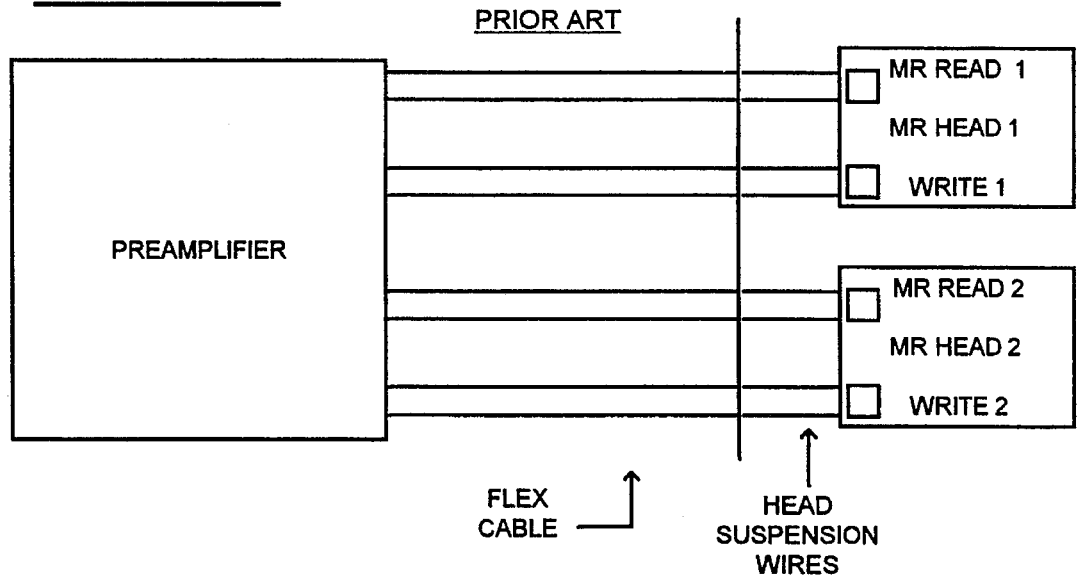
FIG. 4 is a block diagram representation illustrating a prior art connection arrangement for magneto-resistive transducer heads.

In the disk file 10 that includes a number of MR heads 34 equal to N, the number of required read signal lines is reduced, by N/2 where N is an even number of MR heads or by (N−1)/2 where N is an odd number of MR heads, as compared to the prior art arrangement of FIG. 4. Similarly, the required number of I/O connections of preamplifier 60 can be reduced.

While the invention has been described with reference to details of the illustrated embodiment, these details are not intended to limit the scope of the invention as defined in the appended claims.

What is claimed is:

1. A direct access storage device comprising:

at least one disk mounted for rotation about an axis and having opposed disk surfaces for storing data;

magneto-resistive (MR) transducer means mounted for movement across respective disk surfaces, each for writing to and for reading data signals from a respective disk surface; each said MR transducer means including a write element and a read element, preamplifier means, associated with said MR transducer means, for amplifying read and write signals; and flex cable means for coupling said read and write signals between said preamplifier means and said MR transducer means, said flex cable means including a common read return signal line for each sequential pair of said MR transducer means, and said flex cable means further including two write signal lines coupled to each write element, and a read signal line and said common read return signal line for each of said MR transducer means of said sequential pair of said MR transducer means.

2. A direct access storage device as recited in claim 1 wherein said common read return signal line is disposed between said read signal line for each of said MR transducer means of said sequential pair.

3. A direct access storage device comprising:

at least one disk mounted for rotation about an axis and having opposed disk surfaces for storing data;

magneto-resistive (MR) transducer means mounted for movement across respective disk surfaces, each for writing to and for reading data signals from a respective disk surface; each said MR transducer means including a write element and a read element, preamplifier means, associated with said MR transducer means, for amplifying read and write signals; and flex cable means for coupling said read and write signals between said preamplifier means and said MR transducer means, said flex cable means including a common read return signal line for each sequential pair of said MR transducer means and said flex cable means further including two write signal lines coupled to each write element, and a read signal line and said common read return signal line for each of said MR transducer means of said sequential pair of said MR transducer means, said signal lines extending substantially in parallel along said flex cable means.

4. A direct access storage device as recited in claim 3 wherein said common read return signal line is disposed between said read signal line for each of said MR transducer means of said sequential pair.

* * * * *